US012782887B2

(12) United States Patent
Strixner et al.

(10) Patent No.: US 12,782,887 B2
(45) Date of Patent: Nov. 3, 2026

(54) METHOD AND CONFIGURATION SYSTEM FOR CONFIGURING A MACHINE CONTROLLER

(71) Applicant: Siemens Aktiengesellschaft, Munich (DE)

(72) Inventors: Ferdinand Strixner, Munich (DE); Daniel Hein, Munich (DE); Markus Michael Geipel, Munich (DE); Dieter Bogdoll, Munich (DE); Axel Reitinger, Munich (DE); Johannes Kehrer, Munich (DE); Carlos Andres Palacios Valdes, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 294 days.

(21) Appl. No.: 18/578,841

(22) PCT Filed: Jul. 7, 2022

(86) PCT No.: PCT/EP2022/068817

§ 371 (c)(1),
(2) Date: Jan. 12, 2024

(87) PCT Pub. No.: WO2023/001561

PCT Pub. Date: Jan. 26, 2023

(65) Prior Publication Data

US 2024/0310794 A1 Sep. 19, 2024

(30) Foreign Application Priority Data

Jul. 21, 2021 (EP) .................................... 21186997

(51) Int. Cl.
*G05B 13/02* (2006.01)

(52) U.S. Cl.
CPC ................................ *G05B 13/0245* (2013.01)

(58) Field of Classification Search
None
See application file for complete search history.

(56) References Cited

U.S. PATENT DOCUMENTS

2020/0410399 A1* 12/2020 Lang ..................... G06N 3/006

FOREIGN PATENT DOCUMENTS

CN 112216341 A 1/2021
CN 112882449 A 6/2021
(Continued)

OTHER PUBLICATIONS

Poli et al, "Genetic Programming An Introductory Tutorial and a Survey of Techniques and Applications", Oct. 2007, pp. 5-19 (Year: 2007).*

(Continued)

*Primary Examiner* — David Earl Ogg
(74) *Attorney, Agent, or Firm* — Schmeiser Olsen PLLC

(57) ABSTRACT

To configure a machine controller by an action execution tree, predefined action patterns are read in. A multiplicity of action execution trees for a machine to be controlled is also generated. For a respectively generated action execution tree, a performance for controlling the machine based on the respective action execution tree is determined. The predefined action patterns are also sought in the respective action execution tree. An action pattern found in the respective action execution tree is then replaced at least in part by a reference to the predefined action pattern. A tree size of the thus modified action execution tree is furthermore determined. Based on the generated action execution trees, a numerical optimization method is then used to determine an action execution tree that is optimized with regard to better
(Continued)

performance and smaller tree size, and this is output in order to configure the machine controller.

15 Claims, 3 Drawing Sheets

(56) References Cited

FOREIGN PATENT DOCUMENTS

| | | | |
|---|---|---|---|
| EP | 3651082 | A1 | 5/2020 |
| EP | 3835894 | A1 | 6/2021 |
| WO | 2020099135 | A1 | 5/2020 |

OTHER PUBLICATIONS

Colledanchise et al, "Learning of Behavior Trees for Autonomous Agents", Apr. 2015, arxiv.org/abs/1504.05811, pp. 1-7 (Year: 2015).*

PCT International Search Report of International Searching Authority mailed Oct. 21, 2022 corresponding to PCT International Application No. PCT/EP2022/068817 filed Jul. 7, 2022.

Langdon, William B. et al: "Genetic Programming: An Introduction and Tutorial, with a Survey of Techniques and Applications" In: "From Motor Learning to Interaction Learning in Robots; Workshop From Motor to Interaction Learning in Robots; IEEE/RSJ International Conference on Intelligent Robot Systems; (St. Louis, Mo., USA) : Oct. 11-15, 2009", Jan. 1, 2008 (Jan. 1, 2008), Springer-Verlag, Berlin Heidelberg, XP055385787; Bd. 115, Seiten 927-1028, DOI: 10.1007/978-3-540-78293-3_22 * Zusammenfassung; Ab.

* cited by examiner

METHOD AND CONFIGURATION SYSTEM FOR CONFIGURING A MACHINE CONTROLLER

CROSS-REFERENCE TO RELATED APPLICATIONS

This application claims priority to PCT Application No. PCT/EP2022/068817, having a filing date of Jul. 7, 2022, which claims priority to European Application 21186997.9, having a filing date of Jul. 21, 2021, the entire contents both of which are hereby incorporated by reference.

FIELD OF TECHNOLOGY

The following relates to a method and configuration system for configuring a machine controller.

BACKGROUND

Complex machines, such as e.g., robots, motors, machine tools, turbines, 3D printers, production plants or motor vehicles normally require a controller having a complex configuration for productive operation in order to optimize the performance of the controlled machine in a targeted manner. The performance to be optimized can involve e.g., output, yield, resource requirement, efficiency, precision, pollutant emission, stability, wear and/or other target parameters of the machine.

Machine controllers are frequently configured by experts during the design or commissioning of the machine to be controlled. However, such a configuration by experts is often relatively time-consuming. Furthermore, in many cases, additional effort is required in order to optimize the configuration.

Data-driven machine learning methods are increasingly used for automatically configuring machine controllers. A machine controller can be trained by learning methods of this type to derive those control actions which specifically effect a desired or otherwise optimum behavior of the machine from current operating signals of the machine. A multiplicity of known machine learning methods, in particular reinforcement learning methods, are available for this purpose.

In many cases, however, a configuration optimized by data-driven learning methods is barely comprehensible to or interpretable by experts in terms of its effect relationships. This frequently hinders validation or further development of configurations of this type.

SUMMARY

An aspect relates to a method and a configuration system for configuring a machine controller, by which more readily interpretable configurations can be automatically created.

In order to configure a machine controller by an action execution tree specifying an execution of actions by a machine, predefined action patterns are read in. A multiplicity of action execution trees are further generated for the machine. The action execution trees can be, in particular, behavior trees. For a respectively generated action execution tree, a performance for controlling the machine on the basis of the respective action execution tree is determined. The predefined action patterns are further searched for in the respective action execution tree. An action pattern found in the respective action execution tree is then replaced at least in part by a reference to the predefined action pattern. A tree size of the thus modified action execution tree is further determined. Based on the generated action execution trees, an action execution tree that is optimized with a view to greater performance and smaller tree size is then determined by a numerical optimization method and is output in order to configure the machine controller.

A configuration system, a computer program product (non-transitory computer readable storage medium having instructions, which when executed by a processor, perform actions) and the non-transitory computer-readable, desirably non-volatile, storage medium are also provided in order to carry out the method according to embodiments of the invention.

The method according to embodiments of the invention and the configuration system according to embodiments of the invention can be executed or implemented, for example, by one or more computers, processors, application-specific integrated circuits (ASIC), digital signal processors (DSP) and/or field programmable gate arrays (FPGA).

Due to the at least partial replacement of found action patterns with references, an action execution tree can be made smaller in many cases. The complexity of the action execution tree can normally be reduced in this way. If the tree size of action execution trees is used along with the performance as an optimization criterion, the optimization can be driven in the direction of action execution trees which have predefined action patterns. In this way, an action execution tree or a configuration which normally offers high performance and also has low complexity can be determined. Configurations having low complexity are normally more readily interpretable and can therefore be more easily validated and/or further developed by experts.

According to an embodiment of the invention, the multiplicity of action execution trees can be generated at least partially on the basis of the action patterns. In particular, action execution trees can be composed at least partially from the action patterns. In this way, action execution trees having known and/or readily interpretable action patterns can be generated in a targeted manner.

According to an embodiment of the invention, a predefined initial action execution tree can be read in. The multiplicity of action execution trees can then be generated at least partially on the basis of the initial action execution tree. The initial action execution tree can be, in particular, an action execution created, tested and/or validated by an expert. In this way, expert specifications can be taken into account in determining an optimized action execution tree.

In addition, the initial action execution tree can be executed by an interpreter, wherein a reference sequence of machine actions specified by the initial action execution tree is determined. The generated action execution trees can then also be executed in each case by the interpreter, wherein a respective sequence of machine actions specified by the respective generated action execution tree is determined. A generated action execution tree of which the respective sequence does not match the reference sequence can therefore be rejected. The optimization can be restricted in this way to action execution trees which reproduce the reference sequence. If the initial action execution tree is selected in such a way that machine actions thereby specified, or a predefined selection of these machine actions, only comprise permissible or necessary target machine actions, it can be ensured in this way that the optimization remains restricted to action execution trees which meet predefined development objectives.

Predefined selection information can be read in, by which the machine actions, the respective sequence, in particular reference sequence, of which is to be determined are selected. In this way, in particular, the machine actions which are intended for mandatary execution and to which the optimization is to be restricted can be selected from the machine actions specified by the initial action execution tree.

According to an embodiment of the invention, the numerical optimization method can be a genetic optimization method, by which the multiplicity of action execution trees are also generated. The genetic optimization method can be initialized, in particular, by the initial action execution tree. A fitness function which assigns a greater fitness to higher performance and/or to smaller tree size than to lower performance and/or to larger tree size can be provided for the genetic optimization method. In this way, the optimization can be driven in the direction of high-performing and/or less complex configurations. A multiplicity of efficient standard routines are available to carry out genetic optimization methods of this type.

According to an embodiment of the invention, a Pareto front can be determined for the multiplicity of action execution trees, wherein an increase in performance and a reduction in tree size are used as Pareto objective criteria. The optimized action execution tree can then be derived from action execution trees of the Pareto front. In particular, the optimized action execution tree can be selected or interpolated from action execution trees of the Pareto front. Whereas a selection can be carried out particularly simply, a plurality of advantageous characteristics of action execution trees can also be combined in an interpolation. If the Pareto front is determined with a view to performance and tree size, an optimized action execution tree can be determined which not only offers high performance but also has a small tree size and therefore a low complexity. In this context, a Pareto front is understood to mean a set of action execution trees of which the distance to a mathematically exact Pareto optimum e.g., falls below a given threshold value. Through a restriction to action execution trees of the Pareto front, a space of possible action execution trees is normally substantially restricted, wherein, in particular, non-optimal action execution trees are eliminated. The determination of the optimized action execution tree and possibly further optimizations can thus be substantially simplified.

Action execution trees of the Pareto front can be fed into the genetic optimization method. Alternatively or additionally, action execution trees not contained in the Pareto front can be rejected. In this way, the genetic optimization method can be enriched with advantageous action execution trees. Alternatively, the optimization method can be terminated following the determination of a Pareto front.

In order to determine the performance of a respective action execution tree, a simulation model of the machine, a data-driven model of the machine, the machine itself and/or a machine similar to it can further be controlled by the respective action execution tree and a performance of the machine resulting therefrom can be determined. A surrogate model of the machine which requires fewer computing resources than a complete physical simulation can be used as a simulation model.

In addition, a number of edges, a number of nodes and/or a tree depth of the modified action execution tree or a weighted combination of the number of edges, the number of nodes and/or the tree depth can be determined in order to determine the tree size. The above criteria allow a particularly simple evaluation of the tree size or the complexity of a respective action execution tree.

BRIEF DESCRIPTION

Some of the embodiments will be described in detail, with references to the following Figures, wherein like designations denote like members, wherein.

DETAILED DESCRIPTION

If the same or corresponding reference signs are used in the figures, these reference signs denote the same or corresponding entities which can, in particular, be implemented or designed as described in connection with the relevant figure.

Figure 1:
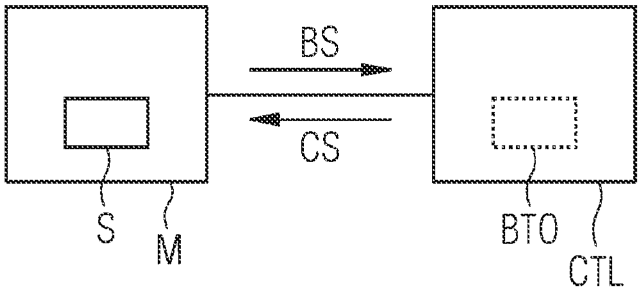
FIG. 1 shows a machine having a machine controller for controlling the machine.

FIG. 1 shows a schematic view of a machine M which is coupled to a machine controller CTL to control the machine M. The machine M can be, in particular, a robot, a motor, a machine tool, a turbine, a production plant, a motor vehicle, a 3D printer, a computer, a mechanical system, an electrical system or a different device or different plant. The machine M has a sensor system S for the continuous measurement and/or capture of operating signals BS of the machine M and, if necessary, of data from an environment of the machine M.

The machine controller CTL is configurable in a computer-aided manner and can be implemented as part of the machine M or totally or partially outside the machine M. The machine controller CTL is intended to be configured by embodiments of the invention in such a way that the machine M is controlled in an optimum manner. Control is also understood to mean regulation, and also an output and use of data or control signals which are control-related, i.e. which contribute to the targeted influencing of the machine M.

In the present exemplary embodiment, the machine controller CTL is intended to be configured by a machine learning method, in particular a genetic optimization method, in such a way that an operation of the machine M is optimized depending on the captured operating signals BS. The term optimization is generally also understood to mean an approximation to an optimum. The performance of the machine M is intended to be increased.

A control behavior of the machine controller CTL is defined by its configuration. The configuration comprises, in particular, an action execution tree, in the form of a behavior tree, which is known to a person skilled in the conventional art and by which actions and, in particular, sequences of actions to be executed by the machine M are specified. An action execution tree is represented by a directed graph which is linked in the form of a tree and which is implemented as a data structure linked in the form of a tree. A multiplicity of efficient control behaviors are known and available for the interpretation and execution of an action execution tree or the machine actions thereby specified.

Figure 2:
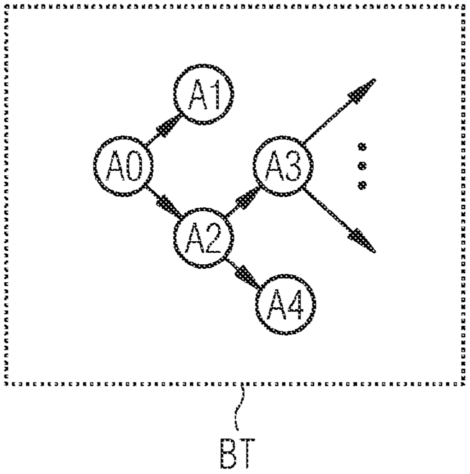
FIG. 2 shows an action execution tree.

FIG. 2 illustrates a basic structure of an action execution tree BT of this type which can be designed, for example, as a behavior tree. The action execution tree BT comprises a directed graph branched in the form of a tree having a plurality of nodes A0, A1, A2, A3, A4, . . . , which are connected by directed edges. Specific nodes of the graph represent machine actions which are to be executed by the machine M depending on predefined conditions. Relationships between conditions and machine actions to be conditionally executed or a sequence of machine actions to be executed can be specified by the directed edges of the graph. A process flow defined by a sequence of machine actions to be executed branches off along the tree structure of the graph depending on the predefined conditions. An action execution tree BT designed as a behavior tree can comprise, in particular, fallback nodes, sequence nodes, control flow nodes and decorators such as “always”, “guard”, “not”, “retry”, “time limit”, “wait for” and/or “while”.

As FIG. 1 further illustrates, an optimized action execution tree BTO, in the form of an optimized behavior tree, is transmitted to the machine controller CTL for the optimized configuration of the machine controller CTL. A control behavior thereby set of the machine controller CTL is also frequently referred to as a policy. The optimized action execution tree BTO is determined by a method according to embodiments of the invention.

The continuously captured operating signals BS of the machine M are transmitted by the sensor system S to the machine controller CTL. The operating signals BS can comprise information relating to operating states of the machine M, to positions or movements of components, to switching states, to control states, to control actions, to physical, chemical or electrical measured quantities and/or to other parameters relevant to the operation of the machine M.

Depending on the transmitted operating signals BS, control signals CS are generated by the machine controller CTL and are transmitted from the machine controller CTL to the machine M for the optimized control of the machine M. The control signals CS are generated depending on the optimized action execution tree BTO in such a way that the sequence of machine actions specified by the optimized action execution tree BTO is executed.

Figure 3:
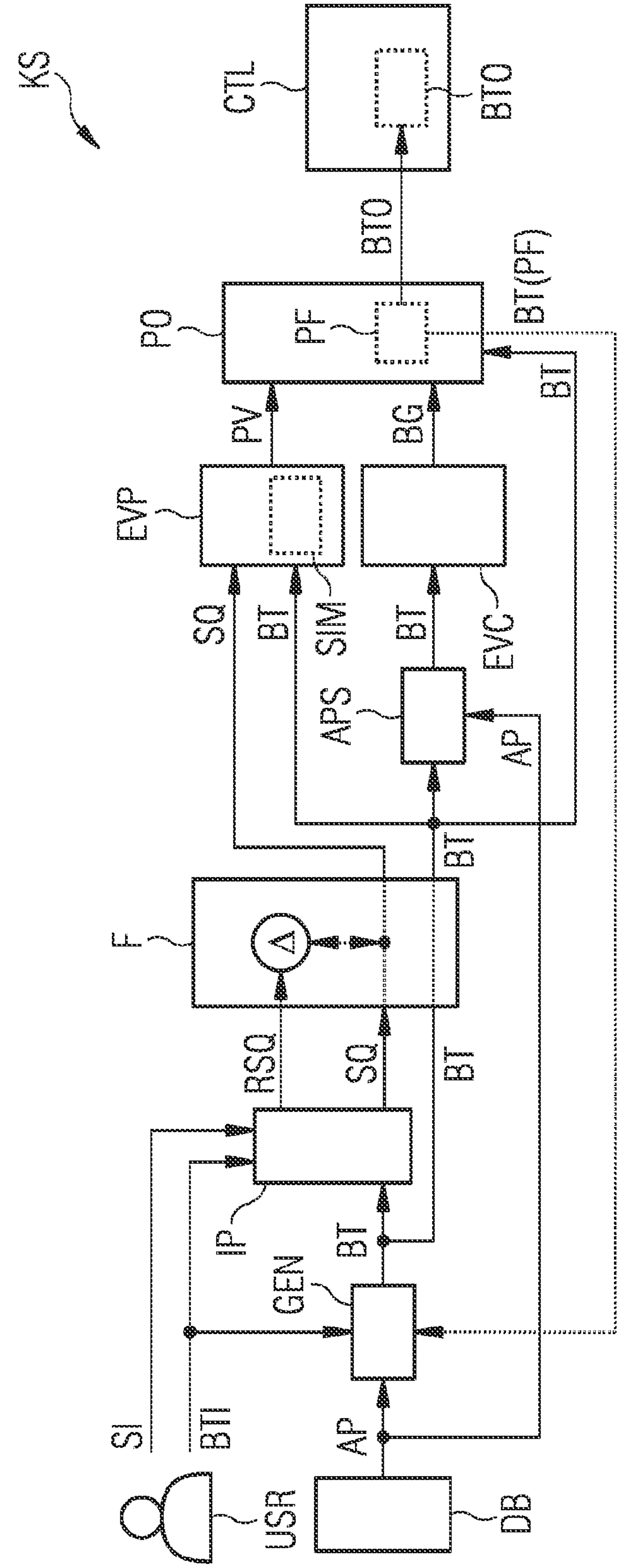
FIG. 3 shows a configuration system according to embodiments of the invention during the configuration of a machine controller.

FIG. 3 shows a schematic view of a configuration system KS according to embodiments of the invention during the configuration of the machine controller CTL.

The machine controller CTL can form part of the configuration system KS or can be arranged totally or partially outside the configuration system KS. The configuration system KS and/or the machine controller CTL has/have one or more processors to carry out the method according to embodiments of the invention, and also one or more storage devices to store data to be processed. As already mentioned above, the machine controller CTL is intended to be configured by an optimized action execution tree BTO in such a way that the machine M is controlled in an optimized manner. The optimized action execution tree BTO is determined by the configuration system KS by a genetic optimization method.

Action patterns AP predefined by the configuration system KS and an initial action execution tree BTI in the form of a behavior tree are read in as a starting point for determining the optimized action execution tree BTO.

The action patterns AP can, in particular, specify sequences of machine actions and/or conditions for their execution. The action patterns AP are represented by partial graphs or partial trees of action execution trees or behavior trees. Idiomatic, easily interpretable, reliable, validated and/or permissible action patterns which have proven effective in performing partial control tasks can be predefined as action patterns AP. In the present exemplary embodiment, the action patterns AP are read in from a database DB or from an otherwise available action pattern library.

The initial action execution tree BTI is created by an expert USR according to technical specifications, requirements or other auxiliary technical conditions for controlling the machine M, and is fed into the configuration system KS. The initial action execution tree BTI specifies an execution of permissible and/or necessary machine actions, and therefore forms a reference for controlling the machine M or for a target configuration of the machine controller CTL. In this way, the initial execution tree BTI to some extent encodes expert knowledge relating to the control of the machine M.

Selection information SI is further fed by the expert USR into the configuration system KS.

A genetic optimization method, inter alia, is used in the present exemplary embodiment to determine an optimized action execution tree BTO. Advantageous action execution trees are searched for within a space of possible action execution trees and are further optimized. For this purpose, a generator GEN of the configuration system KS generates-on an at least partially random basis-a multiplicity of action execution trees BT which in each case specify a possible execution of machine actions by the machine M.

In a respective iteration of the generic optimization method, a fitness of the machine actions thereby specified is evaluated in each case for the generated action execution trees BT. Action execution trees BT having a higher fitness are used with a higher probability for generating further action execution trees BT in a subsequent iteration of the generic optimization method. Action execution trees BT having a lower fitness are excluded accordingly with a higher probability and/or are replaced by newly generated action execution trees. In this way, action execution trees BT having a higher fitness are increasingly generated by the generator GEN. In the present exemplary embodiment, a performance for controlling the machine M on the basis of the action execution tree BT to be evaluated, a tree size of this action execution tree BT and/or a weighted combination of the performance and the tree size are determined in order to determine a respective fitness. In this way, the generation of the action execution trees is driven in the direction of greater performance and smaller tree size. A multiplicity of standard methods are available for carrying out a genetic optimization of this type. Alternatively or additionally, other machine learning methods can also be used for the optimization.

In order to generate advantageous and/or permissible action execution trees BT, the initial action execution tree BTI and the action patterns AP are fed into the generator GEN. The action execution trees BT are then generated by the generator GEN on the basis of the initial action execution tree BTI and with at least partial use of the action patterns AP.

The generated action execution trees BT are transmitted from the generator GEN to an interpreter IP of the configuration system KS. The initial action execution tree BTI and the selection information SI are also fed into the interpreter IP.

The interpreter IP serves to execute action execution trees, wherein a sequence of machine actions specified by the action execution tree concerned is in each case determined. The machine actions which are intended for mandatory execution according to the technical specifications are selected by the selection information SI. In this way, a reference sequence RSQ of machine actions which are intended for mandatory execution is determined by the interpreter IP for the initial action execution tree BTI. A sequence SQ of machine actions thereby specified is further determined by the interpreter IP for each generated action execution tree BT. The reference sequence RSQ, the sequences SQ and the associated action execution trees BT are transmitted to a filter F of the configuration system KS.

The filter F serves, in particular, to filter the generated action execution trees BT. The sequence SQ determined for a respective action execution tree BT is compared with the reference sequence RSQ for this purpose. If the sequence SQ does not match the reference sequence RSQ, this sequence SQ and the action execution tree BT concerned are rejected and are not forwarded by the filter F. Conversely, if the sequence SQ matches the reference sequence RSQ, this sequence SQ and the action execution tree BT concerned are forwarded by the filter F. In this way, it can be ensured that the optimization remains restricted to action execution trees BT which meet predefined development objectives.

The action execution trees BT forwarded by the filter F and the action patterns AP are fed into an action pattern search module APS of the configuration system KS. The action pattern search module APS searches for the action patterns AP in each of the fed in action execution trees BT. If no action pattern AP is found in a respective action execution tree BT, this action execution tree is forwarded unchanged by the action pattern search module APS. Conversely, if an action pattern AP is found in an action execution tree BT, this action execution tree BT is modified by the action pattern search module APS.

Figure 4:
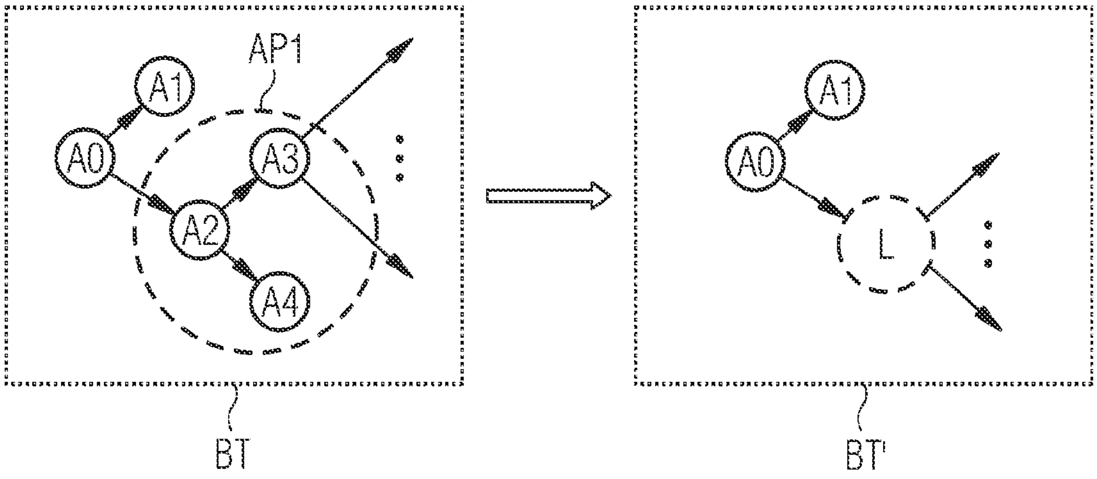
FIG. 4 shows a modification of an action execution tree.

Such a modification of an action execution tree BT is illustrated by way of example in FIG. 4. For this purpose, it is assumed that a partial tree comprising the nodes A2, A3 and A4 of the action execution tree BT corresponds to a predefined action pattern API. After the action pattern API has been found in the action execution tree BT, this partial tree or the action pattern API is replaced in the action execution tree BT by a reference L to the action pattern API, as a result of which a modified action execution tree BT' is formed. If a plurality of nodes, here A2, A3 and A4, and edges of the action execution tree BT are replaced by the reference L, the tree size of the action execution tree BT and therefore its complexity are reduced.

For the sake of clarity, modified action execution trees are denoted below with the same reference sign BT as unchanged action execution trees.

As FIG. 3 further illustrates, the unchanged or modified action execution trees BT are transmitted from the action pattern search module APS to a complexity evaluator EVC of the configuration system KS.

The complexity evaluator EVC serves the purpose of quantifying a tree size BG for a respective action execution tree BT. For this purpose, nodes and/or edges of the respective action execution tree BT are counted by the complexity evaluator EVC and/or the tree depth of the action execution tree BT is determined and a tree size BG is derived therefrom. A sum, weighted in each case by predefined weighting factors, of the number of nodes, number of edges and/or tree depth can be determined in each case and output as the tree size BG. The determined tree size BG is transmitted from the complexity evaluator EVC to a Pareto optimizer PO of the configuration system KS.

In addition, the action execution trees BT forwarded by the filter F are fed into a performance evaluator EVP of the configuration system KS and into the Pareto optimizer PO. The sequences SQ forwarded by the filter F are further fed into the performance evaluator EVP.

The performance evaluator EVP serves the purpose of quantifying, for a respective action execution tree BT, a performance of the machine M controlled by this action execution tree BT. In this way, a control performance of a machine controller CTL configured by this action execution tree BT is evaluated to a certain degree.

The performance to be determined can relate, in particular, to output, yield, reference value compliance, clock rate, product quality, speed, time requirement, runtime, precision, error rate, resource consumption, effectiveness, efficiency, pollutant emission, stability, wear, service life, physical behavior, mechanical behavior, chemical behavior, electrical behavior, an auxiliary condition to be observed and/or other target parameters which are to be optimized for the machine M which is to be controlled.

For the respective action execution tree BT and, in particular, for the associated sequence SQ of machine actions, the performance evaluator EVP determines a respective performance value PV which quantifies the performance of the machine M executing the sequence SQ. The performance evaluator EVP has a simulation model SIM of the machine M for this purpose. A behavior of the machine M induced by the respective action execution tree BT or by the respective sequence SQ of machine actions is simulated by the simulation model SIM for a multiplicity of time steps. A cumulated reward or accumulated yield of the simulated behavior is measured. A surrogate model, for example a data-driven model of the machine M which normally requires fewer computing resources than a detailed physical simulation, is used as a simulation model. A cumulated reward determined in this way can be output as the resulting performance value PV.

The performance value PV determined for the respective action execution tree BT is transmitted from the performance evaluator EVP to the Pareto optimizer PO.

The Pareto optimizer PO serves to perform a Pareto optimization and, in particular, to determine a Pareto front PF for the action execution tree BT evaluated by the complexity evaluator EVC and the performance evaluator EVP.

A Pareto optimization is a multi-criteria optimization in which a plurality of different objective criteria, referred to as Pareto objective criteria, are taken into account independently. A Pareto front PF is determined as a result of the Pareto optimization. A Pareto front of this type is also frequently referred to as a Pareto set. A Pareto front, here PF, comprises those solutions to a multi-criteria optimization problem in which one objective criterion cannot be improved without adversely affecting another objective criterion. A Pareto front therefore forms to some extent a set of optimum compromises. In particular, solutions not contained in the Pareto front can still be improved in terms of at least one objective criterion. Consequently, a multiplicity of solutions that are certainly not optimal are eliminated by a restriction to the Pareto front. Insofar as a Pareto front normally comprises only a very small part of a possible solution space, a subsequent selection effort or further optimization effort is substantially reduced through restriction to a Pareto front.

According to embodiments of the invention, a Pareto front PF is determined by the Pareto optimizer PO for the set of action execution trees BT, wherein an increase in performance and a reduction in tree size are used as Pareto objective criteria. A Pareto front PF should also be understood to mean a set of action execution trees of which the distance to a mathematically exact Pareto optimum, for example, falls below a given threshold value. The optimization is performed in the direction of greater performance and smaller tree size. A multiplicity of standard routines are available for Pareto optimizations of this type.

In the present exemplary embodiment, a Pareto front PF is determined by the Pareto optimizer PO within the generated action execution trees BT depending on the transmitted tree sizes BG and performance values PV of the generated action execution trees BT. An optimized action execution tree BTO is then selected or interpolated from the resulting Pareto front PF. If necessary, predefined selection criteria, in particular one or more further optimization criteria, can also be applied in the selection or interpolation of the optimized action execution trees BTO.

By restricting the selection, interpolation or a subsequent optimization to the Pareto front PF, a space of action execution trees to be processed is normally substantially restricted, wherein, in particular, non-optimal action execution trees are eliminated. The selection or interpolation of the optimized action execution tree BTO or further optimizations are thus substantially simplified.

Action execution trees BT(PF) of the Pareto front PF can optionally be fed into the genetic optimization method in order to thus enrich the genetic optimization method with advantageous action execution trees. A corresponding feedback of action execution trees BT(PF) of the Pareto front PF from the Pareto optimizer PO to the generator GEN is indicated by a dotted arrow in FIG. 3.

The optimized action execution tree BTO is normally output in order to configure the machine controller CRL and/or is transmitted directly to the machine controller CTL in order to configure the latter for optimized control of the machine M. The resulting configuration of the machine controller CTL normally results in a control behavior which simultaneously offers both high performance and low complexity. The last-named characteristic results in configurations that can usually be substantially more readily interpreted and therefore more easily validated and and/or further developed by experts.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring a machine controller by an action execution tree specifying an execution of actions by a machine, wherein:

a) reading in predefined action patterns;

b) generating a multiplicity of action execution trees for the machine;

c) for a respectively generated action execution tree:

determining a performance for controlling the machine on the basis of the respectively generated action execution tree; and replacing an action pattern in the respectively generated action execution tree at least in part by a reference to the predefined action patterns, resulting in a modified action execution tree and a modified tree size of the modified action execution tree; and d) determining, based on the multiplicity of generated action execution trees, an action execution tree that is optimized with a view to greater performance and smaller tree size by a numerical optimization method and is output in order to configure the machine controller.

2. The method as claimed in claim 1, wherein said generating the multiplicity of action execution trees comprises generating the multiplicity of action execution trees at least partially on the basis of the predefined action patterns.

3. The method as claimed in claim 1, wherein a predefined initial action execution tree is read in, and wherein said generating the multiplicity of action execution trees comprises generating the multiplicity of action execution trees at least partially on the basis of the predefined initial action execution tree.

4. The method as claimed in claim 1, wherein a predefined initial action execution tree is read in, the predfined initial action execution tree is executed by an interpreter, wherein a reference sequence of machine actions specified by the initial action execution tree is determined, the generated multiplicity of action execution trees are executed in each case by the interpreter, wherein a respective sequence of machine actions specified by the respectively generated action execution tree is determined, and the respectively generated action execution tree, the respective sequence of machine actions of which does not match the reference sequence of machine actions, is rejected.

5. The method as claimed in claim 4, wherein predefined selection information is read in, and the machine actions of which the respective sequence is to be determined are selected on the basis of the predefined selection information.

6. The method as claimed in claim 1, wherein the numerical optimization method is a genetic optimization method, and wherein said generating the multiplicity of action execution trees comprises generating the multiplicity of action execution trees by the genetic optimization method.

7. The method as claimed in claim 1, wherein a Pareto front is determined for the generated multiplicity of action execution trees, wherein an increase in performance and a reduction in tree size are used as Pareto objective criteria, and the optimized action execution tree is derived by action execution trees of the Pareto front.

8. The method as claimed in claim 6, wherein action execution trees of a Pareto front are fed into the genetic optimization method and/or the generated multiplicity of action execution trees not contained in the Pareto front are rejected.

9. The method as claimed in claim 1, wherein in order to determine the performance of the respectively generated action execution tree, a simulation model of the machine, a data-driven model of the machine, the machine itself and/or a machine similar to it are controlled by the respectively generated action execution tree and a performance of the machine resulting therefrom is determined.

10. The method as claimed in claim 1, wherein a number of edges, a number of nodes and/or a tree depth of the modified action execution tree or a weighted combination of the number of edges, the number of nodes and/or the tree depth are determined in order to determine the modified tree size.

11. The method as claimed in claim 1, wherein the respectively generated action execution tree is a behavior tree.

12. The method as claimed in claim 1, wherein the machine is a robot, a motor, a machine tool, a turbine, a production plant, a motor vehicle, a 3-dimensional (3D) printer, a mechanical system, or an electrical system.

13. A configuration system for configuring the machine controller for the machine, configured to carry out the method as claimed in claim 1.

14. A computer program product, comprising a computer readable hardware storage device having computer readable program code stored therein, said program code executable by a processor of a computer system to implement the method as claimed in claim 1.

15. A computer-readable storage medium having the computer program product as claimed in claim 14.

* * * * *